(12) United States Patent
Lee

(10) Patent No.: US 7,388,479 B2
(45) Date of Patent: Jun. 17, 2008

(54) HUMAN SENSING BACK-UP ALARM DEVICE

(76) Inventor: Youl Gi Lee, 109-1402, Daewoo 2Cha Apt., Dongchun-dong, Yeonsu-gu, Incheon Metropolitan City, Kyunggi-do (KR)

( * ) Notice: Subject to any disclaimer, the term of this patent is extended or adjusted under 35 U.S.C. 154(b) by 169 days.

(21) Appl. No.: 11/262,587

(22) Filed: Oct. 31, 2005

(65) Prior Publication Data
US 2006/0255925 A1 Nov. 16, 2006

(30) Foreign Application Priority Data
May 10, 2005 (KR) .................. 10-2005-0038956

(51) Int. Cl.
*B60Q 1/26* (2006.01)

(52) U.S. Cl. .............. 340/463; 340/435; 340/436; 340/471; 340/474; 340/901; 340/903; 701/300; 701/301

(58) Field of Classification Search .......... 340/463, 340/464, 431, 435, 436, 471, 474, 901, 903, 340/942; 342/70, 71; 701/300, 301
See application file for complete search history.

(56) References Cited
U.S. PATENT DOCUMENTS 5,160,927 A * 11/1992 Cherry et al. ............ 340/904
6,021,373 A * 2/2000 Zuercher et al. .......... 701/300
6,731,204 B2 * 5/2004 Lehmann ................. 340/435
6,977,584 B2 * 12/2005 Milliken ................... 340/468

* cited by examiner

Primary Examiner—Hung Nguyen
(74) Attorney, Agent, or Firm—St. Onge Steward Johnston & Reens LLC

(57) ABSTRACT

Disclosed is a human sensing back-up alarm system capable of generating a loud alarm sound for a predetermined period of time using a speaker to protect humans or vehicles if the humans or vehicles are detected behind construction equipment or a vehicle when the construction equipment or the vehicle backs up, and generating a low alarm sound if the humans or vehicles are not detected behind the construction equipment or the vehicle, thereby effectively preventing accidents while minimizing ambient noise and noise pollution. The human sensing back-up alarm device includes a PCB control part for controlling an alarm sound, a human sensing part for electrically sensing an optical signal, and a speaker part for converting an electric signal into a mechanical signal. The PCB control part includes a clock generator for generating the alarm sound, a clock divider for dividing clocks generated from the clock generator, a terminal unit, a loudness control unit for adjusting the loudness of the alarm sound, a non-continuous sound control unit for generating a non-continuous sound, a speaker drive unit for driving the speaker part and a power source for stabilizing power applied to a vehicle.

8 Claims, 4 Drawing Sheets

HUMAN SENSING BACK-UP ALARM DEVICE

This application claims priority of Korean Patent Application No. 2005-0038956 filed on May 10, 2005.

BACKGROUND OF THE INVENTION

1. Field of the Invention

The present invention relates to a back-up alarm device of construction equipment or a vehicle including an optical human sensing part and a human sensing part. More particularly, the present invention relates to a human sensing back-up alarm device capable of detecting the rear of construction equipment or a vehicle by using an optical human sensing part when the construction equipment or the vehicle backs up, generating a loud sound for a predetermined period of time by using a speaker if a human or a vehicle is detected behind the construction equipment or the vehicle to ensure safety of the humans and vehicles, and minimizing ambient noise by generating a low sound when there are no humans or vehicles behind the construction equipment or the vehicle.

2. Description of the Prior Art

Conventionally, when construction equipment, such as a loader, a forklift truck, an excavator or a bulldozer, or a vehicle, such as a dump truck or a cargo truck, backs up, a back-up alarm device operates together with a back-up lamp by means of a switch attached to a reverse gear.

The above back-up lamp and the back-up alarm device are installed in the construction equipment in order to prevent accidents caused by the construction equipment being operated in a large working field where many workers are on the job.

However, various back-up alarm devices capable of generating sounds having various levels are installed on the rear portion of the construction equipment according to the type of the construction equipment. Thus, since such construction equipment is used in various working fields, the level of ambient noise is variously formed in the working fields.

In addition, the back-up alarm device generating a sound having a predetermined level may be useless if it is employed in a working field having a high level of ambient noise. In order to solve the above problem, it is necessary to provide an intelligent back-up alarm device capable of automatically adjusting the loudness of the sound according to the environment in the working field.

According to conventional technologies, back-up alarm devices generating sounds having various loudness levels or a sound having the loudness level to be controlled according to the level of ambient noise during an alarm is generated with a high/low frequency compensation function for effectively removing high/low frequency signal components of detected ambient noise and a response compensation function for responding to an instant signal component of detected ambient noise are provided for mobile structures or industrial machines.

Until now, the back-up alarm device generating a sound having predetermined loudness is generally used for the construction equipment. Thus, when the construction equipment backs up in the working field having a high level of ambient noise, people cannot recognize the sound generated from the back-up alarm device because the predetermined sound loudness is too low for the above working field. In contrast, when the construction equipment backs up in the resident region, the sound generated from the back-up alarm device may cause noise pollution because the predetermined sound loudness of the sound generated from the back-up alarm device is too high for the resident region.

In order to solve the above problem, a back-up alarm device capable of controlling the loudness of a sound according to the loudness level of ambient noise has been suggested. However, since the back-up alarm device is attached to the rear portion of the construction equipment, the back-up alarm device may regard the sound generated from an engine of the construction equipment as ambient noise, so the back-up alarm device generates the sound with the maximum loudness. Thus, the back-up alarm device also causes sound pollution when it is used in the resident region.

The conventional technologies also provide a back-up alarm device, in which all kinds of switches of the construction equipment are connected to a buzzer sound output section through internal circuits, so that the driver can be alerted to whether the driver has precisely operated a desired functional switch based on a signal tone generated when the switches are operated. In addition, the driver can recognize whether the switches are operated based on the signal tone. Furthermore, a back-up alarm device having an error diagnosis function is provided in order to allow the driver to check whether the circuits and switches have defects during the switching operation.

As mentioned above, according to the conventional the back-up alarm installed in the construction equipment, the driver must directly control the loudness of the sound generated from the back-up alarm device based on ambient noise, so the driver of the construction equipment may feel inconvenienced in using the conventional back-up alarm device.

SUMMARY OF THE INVENTION

Accordingly, the present invention has been made to solve one or more of the above-mentioned problems occurring in the prior art, and an object of the claimed invention is to provide a human sensing back-up alarm device capable of preventing accidents by detecting the rear of construction equipment or a vehicle using an optical human sensing part when the construction equipment or the vehicle backs up and generating an alarm sound having a high loudness for a short period of time regardless of ambient noise using a speaker if humans or vehicles are detected behind the construction equipment or the vehicle, instead of generating a sound having a predetermined loudness.

Another object of the present invention is to provide a human sensing back-up alarm device capable of generating an alarm sound having a high loudness using a speaker if humans or vehicles are detected behind construction equipment or a vehicle when the construction equipment or the vehicle backs up in a working field having loud ambient noise, generating an alarm sound for a short period of time if humans or vehicles are detected in behind the construction equipment or the vehicle when the construction equipment or the vehicle backs up in a working field having low ambient noise, and minimizing ambient noise and noise pollution by generating a sound having a low loudness if there are no humans or vehicles behind the construction equipment or the vehicle when the construction equipment or the vehicle backs up.

In order to accomplish these objects, according to one aspect of the present invention, there is provided a human sensing back-up alarm device comprising: a PCB control part for controlling an alarm sound; a human sensing part for electrically sensing an optical signal; and a speaker part for converting an electric signal into a mechanical signal, wherein the PCB control part includes a clock generator for generating the alarm sound, a clock divider for dividing clocks generated from the clock generator, a terminal unit, a sound loudness control unit for adjusting a loudness of the alarm sound, a non-continuous sound control unit for generating a non-continuous sound, a speaker drive unit for driving the speaker part and a power source for stabilizing power applied to a vehicle.

According to the exemplary embodiment of the present invention, the human sensing part includes an IR sensor for converting an IR signal into the electric signal and a signal treating part, wherein the signal treating part is comprised of a primary amplifying unit for amplifying micro signals generated form the IR sensor and having basic filter characteristics, a secondary amplifying unit for secondarily amplifying the primarily amplified signal and having a band pass filter function for shielding noise components, and a signal detector for detecting effective signals.

In addition, the optical human sensing part is installed at a front end of the IR sensor and includes an optical condenser lens for collecting intrinsic IR ray generated from a human and an optical filter for shielding extra ray, which is not necessary to extract signals.

According to another aspect of the present invention, there is provided a human sensing back-up alarm device comprising: an outer case including a front case; an optical condenser lens installed at a front center of the front case and extending into an inner portion of the outer case for collecting intrinsic IR ray generated from a human; an optical filter installed in the optical condenser lens for shielding extra ray, which is not necessary to extract signals; a human sensing part installed in a human sensing control PCB through an IR sensor; a speaker part installed in a center portion of the outer case; and a PCB control part installed at an outer portion of the speaker part, wherein an epoxy molding compound is provided in the outer case in order to seal the human sensing back-up alarm device while integrally forming the PCB control part with the speaker part.

According to the exemplary embodiment of the present invention, the human sensing part includes the IR sensor for converting an IR signal into the electric signal and a signal treating part, wherein the signal treating part is comprised of a primary amplifying unit for amplifying micro signals generated form the IR sensor and having basic filter characteristics, a secondary amplifying unit for secondarily amplifying the primarily amplified signal and having a band pass filter function for shielding noise components, and a signal detector for detecting effective signals.

In addition, the optical filter allows ray having a wavelength of 7 to 14 µm to pass therethrough, exclusively.

According to still another aspect of the present invention, there is provided a human sensing back-up alarm device comprising: a PCB control part including a clock generator for generating the alarm sound, a clock divider for dividing clocks generated from the clock generator, a terminal unit, a loudness control unit for adjusting a loudness of the alarm sound, a non-continuous sound control unit for generating a non-continuous sound, a speaker drive unit for driving the speaker part and a power source for stabilizing power applied to a vehicle; a human sensing part for detecting a movement of a human, the human sensing part including an IR sensor for converting an IR signal into the electric signal, a primary amplifying unit for amplifying micro signals generated form the IR sensor and having basic filter characteristics, a secondary amplifying unit for secondarily amplifying the primarily amplified signal and having a band pass filter function for shielding noise components, and a signal detector for detecting effective signals; and a speaker part for converting an electric signal into a mechanical signal.

According to the exemplary embodiment of the present invention, an output-side transistor of an integrated circuit is turned on or off according to a detection result of the IR sensor of the human sensing part in relation to the movement of the human.

The IR sensor is installed between an optical human sensing part and a human sensing control PCB.

The condenser and a resistor of the primary amplifying unit form a low pass filter structure and a cut-off frequency thereof is set to 7 Hz. A cut-off frequency of other resistor and condenser is set to 0.33 Hz.

The terminal unit is connected to both of the clock divider and the power source, the clock divider is connected to both of the clock generator and the non-continuous sound control unit, the power source is connected to the speaker drive unit, the speaker drive unit is connected to both of the non-continuous sound control unit and the speaker part, and the non-continuous sound control unit is connected to the loudness control unit to which the human sensing part is connected.

The speaker drive unit amplifies a current through an OP amp of the non-continuous sound control unit according to an operation of a current amplifier of the loudness control unit.

According to still another aspect of the present invention, there is provided a human sensing alarm device comprising: a human sensing part for detecting a human as a signal to convert it into an electric signal to generate; a loudness control unit for generating a high sound controlling signal when a human detecting signal is inputted by the sensor and a low sound controlling signal when a human detecting signal is not inputted by the sensor part, respectively; a non-continuous sound control unit for outputting a high current controlling signal when a high sound controlling signal is inputted by the loudness control unit and a low current controlling signal when a low sound controlling signal is inputted by the loudness control unit; and a speaking drive unit for driving a speaker at higher sound when a high current controlling signal is inputted by the non-continuous sound control unit and for driving a speaker at lower sound when a low controlling signal is inputted by the non-continuous sound control unit.

In addition, the human sensing part comprises an IR sensor for detecting an IR signal passed through an optical condenser lens unit positioned at the front of the human sensing part; and a signal treating part for filtering and amplifying the signal detected by the IR sensor.

Furthermore, the human sensing part comprises a low pass filter capable of permitting only frequency band of 0.33 Hz ~7 Hz within the range of which humans move.

And also, the non-continuous sound control unit cuts off the high current controlling signal or the low current controlling signal at predetermined time interval to transfer for outputting in the speaker drive unit.

BRIEF DESCRIPTION OF DRAWINGS

The above and other features and advantages of the claimed invention will be more apparent from the following detailed description taken in conjunction with the accompanying drawings.

DETAILED DESCRIPTION OF PREFERRED EMBODIMENTS

Figure 1:
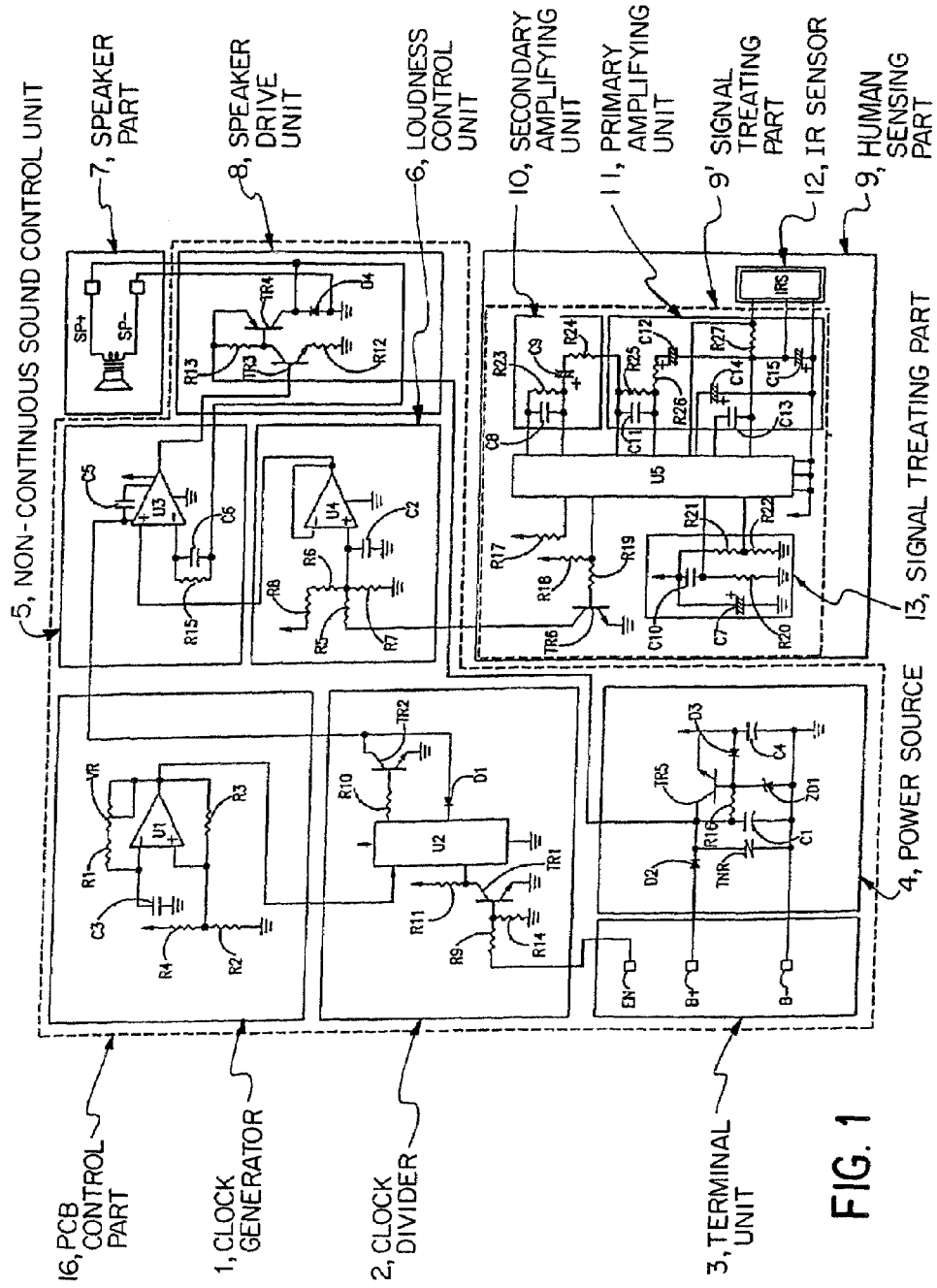
FIG. 1 is a circuit view of a human sensing back-up alarm device according to one embodiment of the present invention.

Hereinafter, preferred embodiments of the present invention will be described with reference to the accompanying drawings. In the following description and drawings, the same reference numerals are used to designate the same or similar components, so repetition of the description on the same or similar components will be omitted.

FIG. 1 is a circuit view of a human sensing back-up alarm device according to one embodiment of the present invention. According to the present invention, the human sensing back-up alarm device for construction equipment includes an optical human sensing part 19 (see, FIG. 2) and a human sensing part 9. When the construction equipment backs up, the optical human sensing part 19 detects the rear of the construction equipment and the human sensing back-up alarm device generates a loud sound if humans or vehicles are detected behind the construction equipment, thereby ensuring safety of humans or vehicles. In addition, if there are no humans or vehicles behind the construction equipment, the human sensing back-up alarm device generates a low sound using a speaker, thereby minimizing ambient noise.

The human sensing back-up alarm device of the present invention mainly includes a PCB (printed circuit board) control part 16 for controlling an alarm sound, the human sensing part 9 for electrically sensing optical signals, and a speaker part 7 for converting electrical signals into mechanical signals.

The PCB control part 16 includes a clock generator 1 for generating the alarm sound, a clock divider 2 for dividing clocks generated from the clock generator 1, a terminal unit 3, a loudness control unit 6 for adjusting the loudness of the alarm sound, a non-continuous sound control unit 5 for generating a non-continuous sound, a speaker drive unit 8 for driving the speaker part and a power source 4 for stabilizing power applied to a vehicle.

The terminal unit 3 is connected to both the clock divider 2 and the power source 4, the clock divider 2 is connected to both the clock generator 1 and the non-continuous sound control unit 5, and the power source 4 is connected to the speaker drive unit 8.

The speaker drive unit 8 is connected to both the non-continuous sound control unit 5 and the speaker part 7.

The non-continuous sound control unit 5 is connected to the loudness control unit 6 to which the human sensing part 9 is connected.

Figure 2:
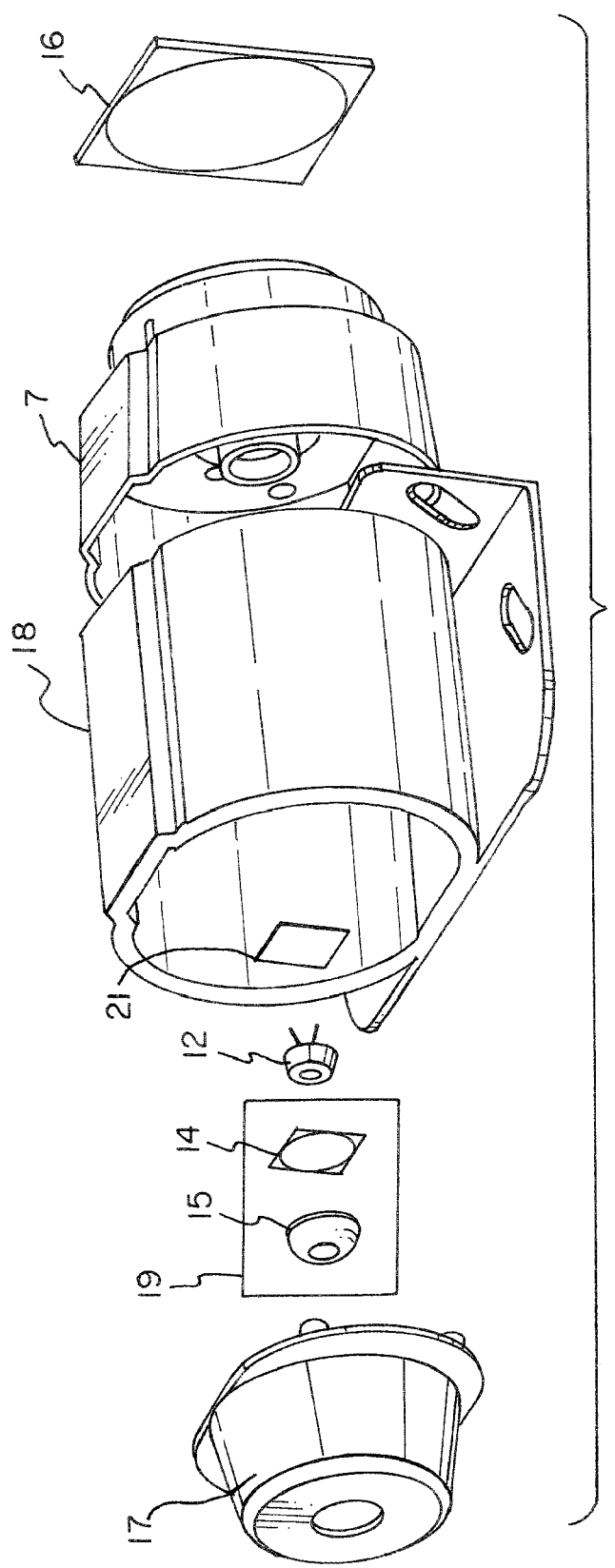
FIG. 2 is an exploded perspective view illustrating a human sensing back-up alarm device according to one embodiment of the present invention.
Figure 3:
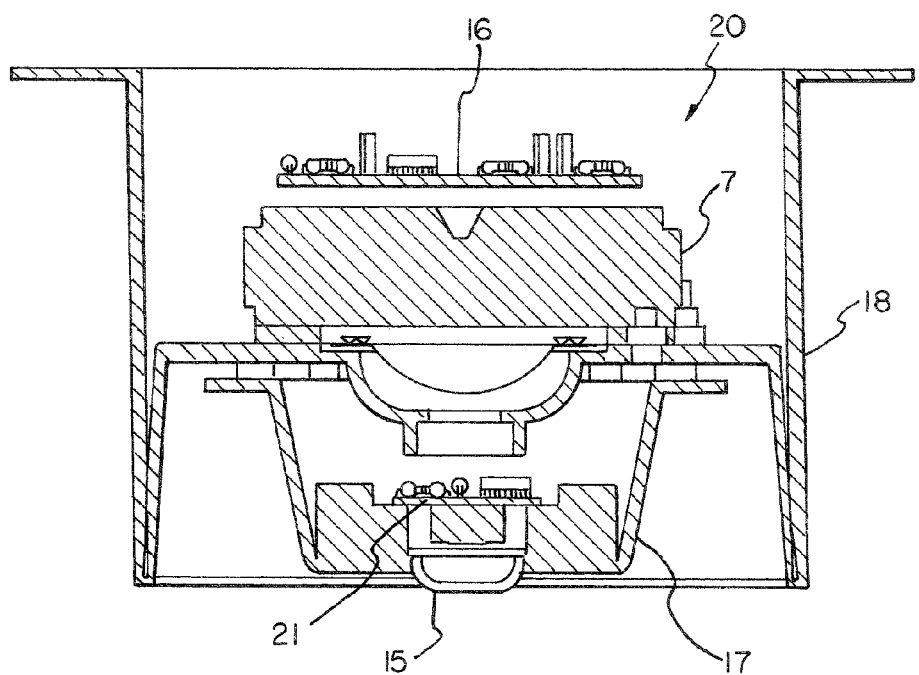
FIG. 3 is a sectional view illustrating an internal structure of an outer case shown in FIG. 2.
Figure 4:
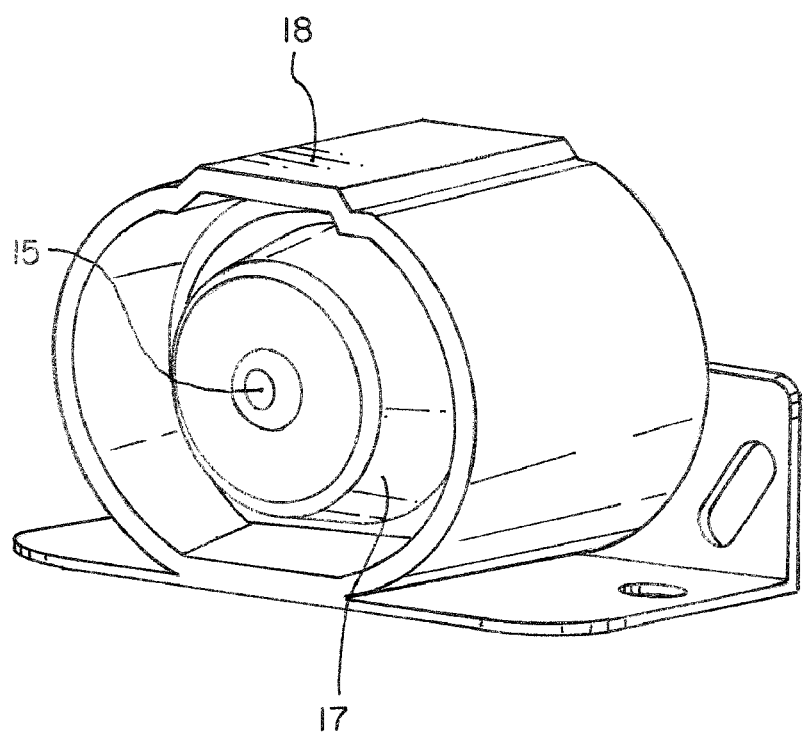
FIG. 4 is a perspective view illustrating a human sensing back-up alarm device according to one embodiment of the present invention.

FIG. 2 is an exploded perspective view illustrating the human sensing back-up alarm device according to one embodiment of the present invention, FIG. 3 is a sectional view illustrating an internal structure of an outer case 18 shown in FIG. 2, and FIG. 4 is a perspective view illustrating the human sensing back-up alarm device according to one embodiment of the present invention.

The outer case 18 shown in FIG. 2 is provided at an inner portion thereof with the optical human sensing part 19 including an optical condenser lens 15 and an optical filter 14, an IR (infrared) sensor 12, a human sensing control PCB 21, a front case 17 for supporting the above elements, the speaker part 7, the PCB control part 16, and an epoxy molding compound 20 (see, FIG. 3) for sealing the outer case 18.

As shown in FIG. 3, the back-up alarm device according to the present invention includes the optical condenser lens 15, the human sensing control PCB 21, the speaker part 7 and the PCB control part 16, which are sequentially stacked in the outer case 18.

The optical condenser lens 15 is installed at a front center portion of the front case 17 and extends towards the inner portion of the outer case 18. Then, the optical filter 14 is installed in the optical condenser lens 15 and the human sensing part 9 (see, FIG. 1) provided in the human sensing control PCB 21 is connected to the optical condenser lens 15 through the IR sensor 12.

In this state, the speaker part 7 is installed in the center portion of the outer case 18. Then, the PCB control part 16 is mounted at the outer portion of the speaker part 7 and the epoxy molding compound 20 is provided in the outer case 18 to seal the outer case 18.

As shown in FIG. 4, the human sensing back-up alarm device of the present invention having the above construction can be fixedly installed in construction equipment or a vehicle by simply using a bracket.

Accordingly, in view of the functional aspect, the human sensing back-up alarm device of the present invention includes the optical human sensing part 19 as shown in FIG. 2 for optically detecting intrinsic ray (or, intrinsic wavelength) of the human and the human sensing part 9 as shown in FIG. 1 for electrically sensing the optical signals.

Hereinafter, the operation of the human sensing back-up alarm device according to the present invention will be described with reference to FIGS. 1 to 4.

The human sensing back-up alarm device of the present invention mainly includes the optical human sensing part 19 and the human sensing part 9 provided in the human sensing control PCB 21, which are installed in the outer case 18. The optical human sensing part 19 consists of the optical condenser lens 15 for collecting intrinsic IR ray of the human and the optical filter 14 for shielding extra light (or, extra wavelength), which is not necessary for extracting the signals.

The human sensing part 9 includes the IR sensor (IRS) 12 for converting the IR signal into the electric signal, a primary amplifying unit 11 for amplifying micro signals generated form the IRS 12 and having basic filter characteristics, a secondary amplifying unit 10 for secondarily amplifying the primarily amplified signal and having a band pass filter function for shielding noise components, and a signal detector 13 for detecting effective signals.

The optical filter 14 of the optical human sensing part 19 must have superior transmissivity and characteristics of allowing a ray with a wavelength of 7 to 14 μm to pass therethrough in order to extract the intrinsic IR ray generated from the human, exclusively. In addition, the optical filter 14 of the optical human sensing part 19 must be adapted to the temperature range of about −25 to +85° C. such that the optical filter 14 can be used for industrial purposes.

Preferably, the optical condenser lens 15 aligned in front of the optical filter 14 is a high refractive condenser lens, which can be easily applied to a small-sized product and a refractive index thereof is not changed according to temperature variation.

As technologies for optical parts have been developed, it is possible to integrate the optical filter 14 with the optical condenser lens 15 by compressing them.

The IRS 12 aligned at the rear of the optical filter 14 is a high sensitive IR sensor installed at a front end of the human sensing control PCB 21. The IRS 12 of the human sensing part 9 provided in the human sensing control PCB 21 can be obtained by connecting two elements in series. The IRS 12 has a T0-5 type metal can structure, which is highly integrated into a ceramic wafer.

The primary amplifying unit 11 of the human sensing part 9 consists of an AC high-gain amplifier and a band pass filter for amplifying micro signals of the IRS 12. The primary amplifying unit 11 of the human sensing part 9 has a circuit structure including resistors R25 and R26 and condensers C11 to C15, which are connected with each other through serial-parallel connections.

The condenser C11, the resistor R25, the condenser C12 and the resistor R26 form a typical low pass filter structure and a cut-off frequency of the condenser C11 and the resistor R25 is set to 7 Hz, which corresponds to the maximum speed of the human. In addition, a cut-off frequency of the resistor R26 and the condenser C12 is set to 0.33 Hz, which corresponds to the minimum speed of the human. Accordingly, a voltage gain of the primary amplifying unit 11 can be obtained according to a formula of Av=(R26+R25)/R26.

That is, if the cut-off frequency is below 0.33 Hz, it means that the human rarely moves and if the cut-off frequency exceeds 7 Hz, it means that the cut-off frequency deviates out of a normal movement of the human. Thus, the condensers and resistors are designed such that they do not sense the cut-off frequency below 0.33 Hz or above 7 Hz, thereby preventing malfunction thereof caused by extra signals.

The secondary amplifying unit 10 having the band pass filter function and consisting of resistors R23 and R24 and condensers C8 and C9, which are connected with each other through serial-parallel connections, is a positive logic amplifier to which the main voltage of the signal detector 13 connected to a rear end of the positive logic amplifier is applied such that it can be connected to the signal detector 13 without using an additional bias voltage. To this end, the condenser C14 of the primary amplifying unit 11 supplies a basic bias of an amp.

In addition, a voltage gain of the secondary amplifying unit 10 can be obtained according to a formula of Av=R23/R26, the secondary amplifying unit 10 being positioned in the signal treating part 9' of the human sensing part 9, and the cut-off frequency of a low pass filter of the band pass filter is set according to a formula of fL=½π R24 C9.

In the meantime, the cut-off frequency of a high pass filter of the band pass filter is set according to a formula of fH=½π R23 C8. The resistor R23 shown in FIG. 1 is used for controlling sensitivity and low leakage type DC cut condensers must be used as the condensers C9 and C14.

The signal detector 13 consisting of resistors R20 and R22 and condensers C7 and C10, which are connected with each other through serial-parallel connections, is a circuit unit for detecting amplified signals and signals processed through the band pass filter. The circuit unit exclusively outputs signals, which have passed through a high comparator and a low comparator.

Accordingly, the primary amplifying unit 11, the secondary amplifying 10 serving as the band pass filter, and the signal detector 13 are connected to one integrated circuit U5, which is a direct IC including an OP amp, a differential amp and a comparator.

An output terminal of the direct IC U5 is connected to the loudness control unit 6 of the PCB control part 16 through resistors R17 to R19 and a transistor TR6, which are connected with each other through serial-parallel connections.

In the meantime, the clock generator 1 provided in the PCB control part 16 is an oscillating unit for generating basic clocks for driving the speaker part. As shown in FIG. 1, the oscillating unit is an RC oscillator including an OP amp U1 and an oscillating frequency thereof is determined based on a resistor R1, a variable resistor VR and a condenser C3. The variable resistor VR connected to the resistor R1 shown in FIG. 1 adjusts the oscillating frequency of the RC oscillator and a basic oscillating frequency of the RC oscillator is 2480 Hz.

Serial-parallel resistors R2 to R4 are connected to a positive (+) terminal of the OP amp U1.

The clock divider 2, to which an output port of the OP amp U1 provided in the clock generator 1 is connected, performs the logical multiply (AND) by using the clocks generated from the clock generator 1 and signals inputted thereto through an EN terminal of a power input section (that is, the terminal unit 3), thereby generating square waves having a duty ratio of 50% through a ripple counter U2 and determining an operating time and a pause time for the speaker. In addition, the clock divider 2 generates basic speaker drive clocks having a duty ratio of 50%.

Serial-parallel resistors R9 and R14 and a transistor TR1 are installed between an input terminal of the ripple counter U2 and the EN terminal, and a transistor TR2 is connected to an output terminal of the ripple counter U2 through the resistor R10.

In addition, a resistor R11 and a diode D1 are connected to the ripple counter U2.

The transistor TR2 is connected to a control terminal of an OP amp U3 provided in the non-continuous sound control unit 5.

The loudness control unit 6 connected to an input terminal of the non-continuous sound control unit 5 consists of a first sound generating part for generating a basic sound and a second sound generating part for generating a sound when the human is detected.

Herein, voltages with two kinds of voltage levels derived from the resistor R8 and the resistors R6, R7 and R5, respectively, are applied to an input port of a current amplifier U4.

The maximum value of amplitude of a speaker drive pulse wave is controlled in order to generate the loud sound when the human is detected.

When the transistor TR6 of the human sensing part 9 is turned on, the resistor R5 is connected to the resistor R7 in a row so that R5//R7 impendence becomes lowered. Thus, the level of voltage applied to the input port of the current amplifier U4 also becomes lowered.

If the transistor TR6 of the human sensing part 9 is turned off, the resistor R7 has infinite impedance so only the resistor R5 exerts an influence upon the impedance. Thus, R5//R7 impendence becomes increased so that the level of voltage applied to the input port of the current amplifier U4 also becomes increased.

The non-continuous sound control unit 5 connected to the output port of the current amplifier U4 provided in the loudness control unit 6 controls the maximum value of the speaker drive wave generated from the loudness control unit 6 and OR-controls the drive pulse wave of the speaker generated from the clock divider 2 by using the above-mentioned clock generated from the clock divider 2 and the OP amp U3, thereby outputting signals to the speaker drive unit 8. In addition, the output signal of the speaker drive unit 8 is fedback to a negative (−) terminal of the OP amp U3 through the resistor R15 and the condenser C6 connected with each other in a row, thereby compensating for the output current of the speaker.

The speaker drive unit 8, to which the output port of the OP amp U3 provided in the non-continuous sound control unit 5 is connected, may current-amplify the speaker drive pulse wave generated from the non-continuous sound control unit 5 through transistors TR3 and TR4 such that the speaker drive pulse wave matches with impedance of the speaker part 7, thereby driving the speaker.

As shown in FIG. 1, the speaker drive unit 8 provided in the PCB control part 16 is constructed in the form of an emitter flower circuit by means of the transistor TR3. Thus, a collector current of the transistor TR4 is determined according to a collector current of the transistor TR3.

In addition, intensity of the sound generated from the speaker is determined according to the collector current of the transistor TR4. The collector current of the transistor TR4 is defined according to a formula of $TR4_c = TR3_c$ hfe, wherein hfe is a current amplification degree of the transistor TR4.

The speaker part 7 converts the electric signal generated from the speaker drive unit 8 into the mechanical signal. The speaker part 7 includes the speaker having the frequency characteristic capable of matching the resonant frequency with the electric signal, so that the sound having the maximum loudness can be generated from the speaker under the same electric signal.

Terminals SP+ and SP− are connected to the speaker drive unit 8.

The power source 4 connected to the speaker drive unit 8 may stabilize power of construction equipment or the vehicle such that constant voltage can be applied to the construction equipment or the vehicle. The power source 4 also driving power to the speaker part 7 and suppresses surge in order to protect the control circuit from inputted noise caused by a TNR device. B+ and B− terminals of the terminal unit 3 are connected to the input terminal of the TNR device and the transistor TR5, the zener diode ZD1, the resistor R16, the diode D3, and condensers C1 and C4 are connected to the output terminal of the TNR device through serial-parallel connections.

Therefore, if the construction equipment having the human sensing back-up alarm device according to the present invention backs up, the IR sensor 12 detects the rear of the construction equipment through the optical condenser lens 15 and the optical filter 14 of the optical human sensing part 19.

In the human sensing control PCB 21, which is operated by means of the IR sensor 12, the output-side transistor TR6 of the integrated circuit U5 is turned on or off according to a detection result of the human sensing part 9 shown in FIG. 1.

First, if the IR sensor 12 detects the movement of the human, the transistor TR6 is turned on so that the current amplifier U4 of the loudness control unit 6 may operate with a high current mode. Thus, the transistors TR3 and TR4 of the speaker drive unit 8 are amplified with high current through the OP amp U3 of the non-continuous sound control unit 5, so that the loud sound is generated to the exterior for a predetermined period of time through the speaker part 7, thereby ensuring safety of the humans or vehicles.

In contrast, if IR sensor 12 of the human sensing part 9 detects no movement of the human, the transistor TR6 of the human sensing part 9 is turned off so that the current amplifier U4 of the loudness control unit 6 may operate with a low current mode. Thus, the transistors TR3 and TR4 of the speaker drive unit 8 are amplified with low current through the OP amp U3 of the non-continuous sound control unit 5, so that the low sound is generated to the exterior, thereby minimizing ambient noise.

The present invention provides the human sensing back-up alarm system capable of detecting humans or vehicles behind the construction equipment or the vehicle when the construction equipment or the vehicle backs up. The back-up alarm system detects intrinsic ray (or, intrinsic wavelength) generated from the humans. In addition, the back-up alarm system includes an optical filter for shielding extra wavelengths except for the intrinsic wavelength generated from the humans, a lens for collecting the wavelengths to improve sensitivity, an electric filter, an amplifier coupled with a band pass filter for amplifying the signal having the intrinsic wavelength of the human, and a detector for detecting the intrinsic wavelength of the human.

The human sensing back-up alarm system according to the present invention can control intensity of the alarm sound based on the signal detected from the human and can modulate the speaker drive signal by using the detected signal.

The present invention provides the human sensing back-up alarm system capable of controlling intensity of the signal and operation time thereof based on the signal detected from the human, in which the intensity of the sound generated from the speaker and the operation time of the speaker are controlled by using the detected signal.

According to the present invention, the human sensing back-up alarm system includes a sensor, a circuit control unit and a speaker, which are integrally formed with each other, and an IR sensor is positioned at a front of the human sensing back-up alarm system.

As described above, when the construction equipment or the vehicle backs up, accidents may occur due to a narrow rear viewing angle. Thus, it is necessary for the construction equipment or the vehicle to generate an alarm sound when the construction equipment or the vehicle backs up. At this time, problems may happen if a back-up alarm device generates a sound having predetermined loudness. For this reason, the present invention provides the human sensing back-up alarm system capable of generating an alarm sound having a high loudness for a predetermined period of time to protect humans or vehicles if the humans or vehicles are detected behind the construction equipment or the vehicle when the construction equipment or the vehicle backs up, and generating an alarm sound having a low loudness if the humans or vehicles are not detected behind the construction equipment or the vehicle, thereby effectively preventing accidents while minimizing ambient noise and noise pollution.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A human sensing back-up alarm device comprising:
   a PCB control part for controlling an alarm sound;
   a human sensing part for electrically sensing an optical signal; and
   a speaker part for converting an electric signal into a mechanical signal, wherein the PCB control part includes a clock generator for generating the alarm sound, a clock divider for dividing clocks generated from the clock generator, a terminal unit, a loudness control unit for adjusting a loudness of the alarm sound, a non-continuous sound control unit for generating a non-continuous sound, a speaker drive unit for driving the speaker part and a power source for stabilizing power applied to a vehicle;

wherein the human sensing part includes an IR sensor for converting an IR signal into the electric signal, a primary amplifying unit for amplifying micro signals generated form the IR sensor and having basic filter characteristics, a secondary amplifying unit for secondarily amplifying the primarily amplified signal and having a band pass filter function for shielding noise components, and a signal detector for detecting effective signals.

2. The human sensing back-up alarm device as claimed in claim 1, wherein the optical human sensing part is installed at a front end of the IR sensor and includes an optical condenser lens for collecting intrinsic IR ray generated from a human and an optical filter for shielding extra ray, which is not necessary to extract signals.

3. A human sensing back-up alarm device comprising:
a PCB control part including a clock generator for generating the alarm sound, a clock divider for dividing clocks generated from the clock generator, a terminal unit, a loudness control unit for adjusting a loudness of the alarm sound, a non-continuous sound control unit for generating a non-continuous sound, a speaker drive unit for driving the speaker part and a power source for stabilizing power applied to a vehicle;
a human sensing part for detecting a movement of a human, the human sensing part including an IR sensor for converting an IR signal into the electric signal, a primary amplifying unit for amplifying micro signals generated form the IR sensor and having basic filter characteristics, a secondary amplifying unit for secondarily amplifying the primarily amplified signal and having a band pass filter function for shielding noise components, and a signal detector for detecting effective signals; and a speaker part for converting an electric signal into a mechanical signal.

4. The human sensing back-up alarm device as claimed in claim 3, wherein an output-side transistor of an integrated circuit controls an amount of current according to a detection result of the IR sensor of the human sensing part in relation to the movement of the human.

5. The human sensing back-up alarm device as claimed in claim 3, wherein the IR sensor is installed between an optical human sensing part and a human sensing control PCB.

6. The human sensing back-up alarm device as claimed in claim 4, wherein a condenser and a resistor of the primary amplifying unit form a low pass filter structure and a cut-off frequency thereof is set to 7 Hz, a cut-off frequency of other resistor and condenser being set to 0.33 Hz.

7. The human sensing back-up alarm device as claimed in claim 3, wherein the terminal unit is connected to both of the clock divider and the power source, the clock divider is connected to both of the clock generator and the non-continuous sound control unit, the power source is connected to the speaker drive unit, the speaker drive unit is connected to both of the non-continuous sound control unit and the speaker part, and the non-continuous sound control unit is connected to the loudness control unit to which the human sensing part is connected.

8. The human sensing back-up alarm device as claimed in claim 3, wherein the speaker drive unit amplifies a current through an OP amp of the non-continuous sound control unit according to an operation of a current amplifier of the loudness control unit.

* * * * *